United States Patent
Tsai et al.

(10) Patent No.: US 8,678,292 B2
(45) Date of Patent: Mar. 25, 2014

(54) RADIO FREQUENCY IDENTIFICATION DEVICE

(75) Inventors: Jian-Min Tsai, New Taipei (TW); Ching-Wei Chang, New Taipei (TW)

(73) Assignee: Auden Techno Corp., Taoyuan County (TW)

(*) Notice: Subject to any disclaimer, the term of this patent is extended or adjusted under 35 U.S.C. 154(b) by 0 days.

(21) Appl. No.: 13/475,978

(22) Filed: May 19, 2012

(65) Prior Publication Data

US 2013/0306739 A1 Nov. 21, 2013

(51) Int. Cl.
*G06K 19/06* (2006.01)
*H01Q 13/10* (2006.01)

(52) U.S. Cl.
USPC .................... 235/492; 343/767; 343/768

(58) Field of Classification Search
USPC .......... 235/492; 343/700 MS, 767, 770, 768; 340/572.1, 572.2, 572.5, 572.7, 572.8, 340/10.1
See application file for complete search history.

(56) References Cited

U.S. PATENT DOCUMENTS

| | | | | |
|---|---|---|---|---|
| 6,031,503 A | * | 2/2000 | Preiss et al. | 343/770 |
| 6,045,368 A | * | 4/2000 | Cadenhead et al. | 439/67 |
| 2004/0150562 A1 | * | 8/2004 | Paun | 343/700 MS |
| 2010/0085262 A1 | * | 4/2010 | Wolf | 343/768 |

FOREIGN PATENT DOCUMENTS

| DE | 202006001608 U1 | * | 7/2007 |
|---|---|---|---|
| TW | M391736 | | 4/2010 |

* cited by examiner

*Primary Examiner* — Christopher Stanford
*Assistant Examiner* — Asifa Habib
(74) *Attorney, Agent, or Firm* — Li & Cai Intellectual Property (USA) Office (57) ABSTRACT

A radio frequency identification (RFID) device includes a metallic antenna plate, a first metallic tube, and a second metallic tube. The metallic antenna plate has a positioning portion and defines a central axis, a first hole, and a second hole. The positioning portion is formed in the path of the central axis and surrounds the second hole. The first and second metallic tubes are disposed on the metallic antenna plate. The first and second metallic tubes each has one end disposed on the positioning portion. The first and second metallic tubes extend across the first and second holes, respectively and are welded to the metallic antenna plate. The portion of the second metallic tube that extends across the second hole is approximately perpendicular to the portion of the first metallic tube that extends across the first hole.

11 Claims, 13 Drawing Sheets

RADIO FREQUENCY IDENTIFICATION DEVICE

BACKGROUND OF THE INVENTION

1. Field of the Invention

The instant disclosure relates to a radio frequency identification (RFID) device; more particularly, to a RFID device having metallic tubes for replacing the printed circuit board (PCB)/circuit components.

2. Description of Related Art

A conventional RFID system typically adopts a dipole antenna, which may be constructed to have vertical or horizontal polarization. The dipole antenna normally includes a printed circuit board (PCB). A pair of transformers is disposed on the PCB to generate a Balun area, and a resonance is generated between different polarities.

The operating bandwidth of the RFID is region-based. For example, the operating bandwidths in the U.S. and Europe are 902-928 MHz and 865-869 MHz, respectively. The different settings imply a distinct antenna structure of the RFID must be designed for each region. Such practice is not cost effective and is not suitable for mass production.

To address the abovementioned issues, the inventor has previously introduced a RFID antenna structure, as taught in the Taiwan Pat. No. M391736. The antenna structure comprises a metallic plate and a PCB. The PCB includes a pair of transformers for generating a Balun area. The metallic plate is a dipole antenna resonant to the vertical and horizontal polarizations. The transformers are connected to respective matching circuits, where the matching circuits are replaced according to the operating bandwidth of the RFID system. Thus, the antenna structure is serviceable for various operating bandwidths.

However, the inventor believes there are still rooms for improvements for the antenna structure of the RFID taught by the Taiwan Pat. No. M391736 (e.g., further cost reduction).

To achieve the abovementioned improvement, the inventors strive via industrial experience and academic research to present the instant disclosure, which can provide additional improvement as mentioned above.

SUMMARY OF THE INVENTION

The instant disclosure provides a RFID device. The device is operable in different bandwidths (such as in U.S. and Europe) by utilizing a plurality of metallic tubes and a metallic antenna plate.

For one embodiment, the RFID device comprises a metallic antenna plate, a first metallic tube, and a second metallic tube. The metallic antenna plate defines a central axis, a first hole, and a second hole. The metallic antenna plate further defines a positioning region in the path of the central axis. The first metallic tube is disposed on the metallic antenna plate. The first metallic tube has a first conducting core, a first insulating layer covering the first conducting core, and a first metallic layer covering the first insulating layer. One end of the first metallic tube is disposed on the positioning region. The first metallic tube extends across the first hole and is welded to the metallic antenna plate on opposite sides of the first hole. For the portion of the first metallic tube that extends across the first hole, the first insulating layer is partially exposed. The second metallic tube is disposed on the metallic antenna plate. The second metallic tube has a second conducting core, a second insulating layer covering the second conducting core, and a second metallic layer covering the second insulating layer. One end of the second metallic tube is disposed on the positioning region. The second metallic tube also extends across the second hole and is welded to the metallic antenna plate on opposite sides of the second hole. For the portion of the second metallic tube that extends across the second hole, the second insulating layer is partially exposed. The portion of the second metallic tube that runs across the second hole is approximately perpendicular to the portion of the first metallic tube that runs across the first hole.

Preferably, the first hole is elongated and divided unequally by the first metallic tube into a large hole and a small hole. In the direction of the long axis of the first hole, the length of the large hole is at least three times the length of the small hole.

Preferably, the second hole is formed concavely on one side of the positioning portion away from the first hole. The second hole is L-shaped defined by a longitudinal region and a transverse region in communication with each other. The second metallic tube extends across the longitudinal region and is welded to the positioning portion on opposite sides of the longitudinal region.

Preferably, the portion of the first metallic tube that extends across the first hole is approximately parallel to the central axis. Whereas the portion of the second metallic tube that extends across the second hole is approximately perpendicular to the central axis.

Preferably, the length of the first metallic tube is longer than the length of the second metallic tube.

Preferably, the RFID device further comprises a welding plate fixed to the positioning portion of the metallic antenna plate. The first and second metallic tubes are spacedly welded to the welding plate.

Preferably, the RFID device further comprises an insulating plate. The insulating plate has a plurality of restricting columns protruded therefrom. The metallic antenna plate is disposed on the insulating plate, and the first and second metallic tubes are restricted by the restricting columns.

Preferably, the metallic plate has a first side portion and a second side portion extending from opposite sides of the positioning portion. The first side portion and the positioning portion cooperatively define a first side hole, and the second side portion and the positioning portion cooperatively define a second side hole.

Preferably, the metallic antenna plate has a substantially U-shaped connecting portion. The opposite ends of the connecting portion are connected to the first and second side portions. The positioning portion, the first side portion, the second side portion, and the connecting portion cooperatively define the first hole. Whereas the other end of the first metallic tube is disposed on the connecting portion.

Preferably, the metallic antenna plate has a coupled portion arranged in the path of the central axis. The coupled portion is spaced apart from the side of the positioning portion away from the first hole.

Based on the above, the RFID device of the instant disclosure utilizes the crossing of the first hole by the first metallic tube and the crossing of the second hole by the second metallic tube to replace the PCB/circuit components of the inventor's prior design. The replacement allows the reduction in manufacturing cost.

In order to further appreciate the characteristics and technical contents of the instant disclosure, references are hereunder made to the detailed descriptions and appended drawings in connection with the instant disclosure. However, the appended drawings are merely shown for exemplary purposes, rather than being used to restrict the scope of the instant disclosure.

DETAILED DESCRIPTION OF THE PREFERRED EMBODIMENTS

For an embodiment of the instant disclosure, please refer to FIGS. 1-5A. FIGS. 1, 1A, 4, and 4A are schematic views of the instant embodiment. FIGS. 1B and 1C are cross-sectional views of the instant embodiment. FIGS. 2-3A and 5-6A are charts showing the experimental results of the instant embodiment.

Figure 1:
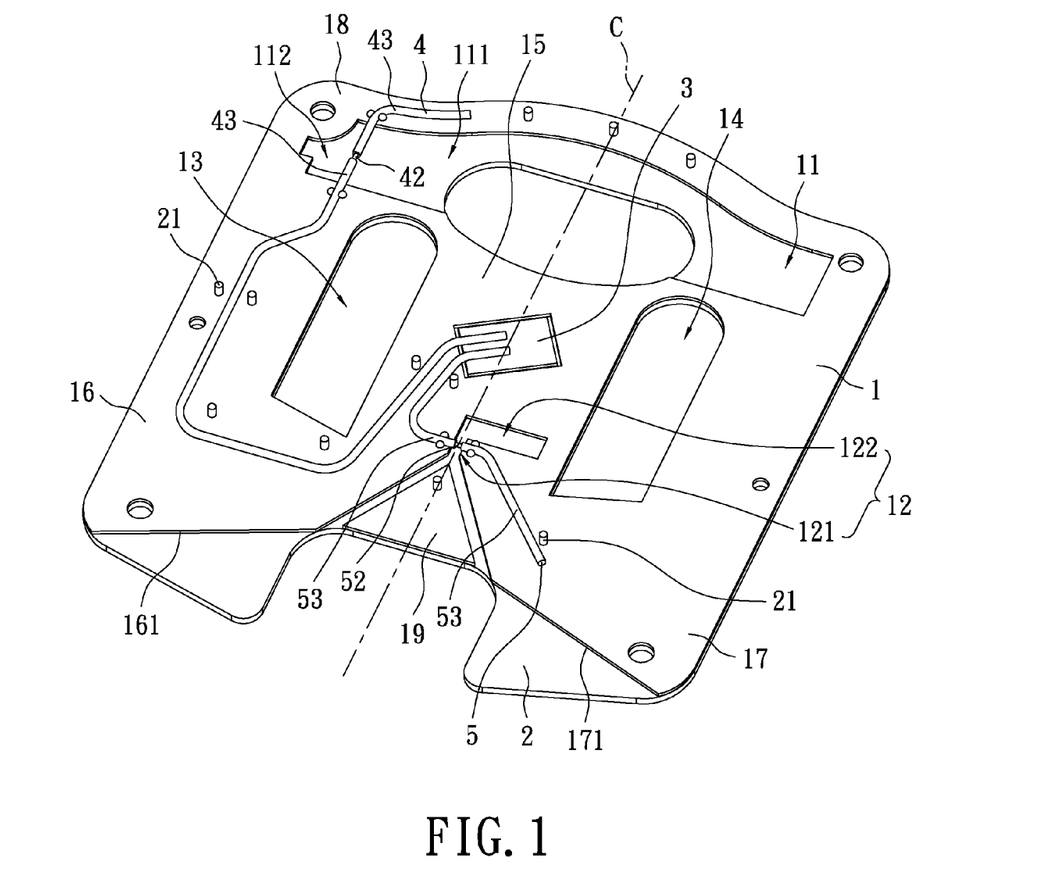
FIG. 1 shows a schematic view of an RFID device of the instant disclosure operable in the U.S. bandwidth.

As shown in FIG. 1, a radio frequency identification (RFID) device of the instant embodiment comprises a metallic antenna plate 1, an insulating plate 2, a welding plate 3, a first metallic tube 4, and a second metallic tube 5. The following description is provided for the RFID device operable in the U.S. bandwidth (902-928 MHz).

The metallic antenna plate 1 is a dipole antenna used for vertical and horizontal polarizations. In this embodiment, the material of the metallic antenna plate 1 is beryllium copper but is not limited thereto.

Figure 1A:
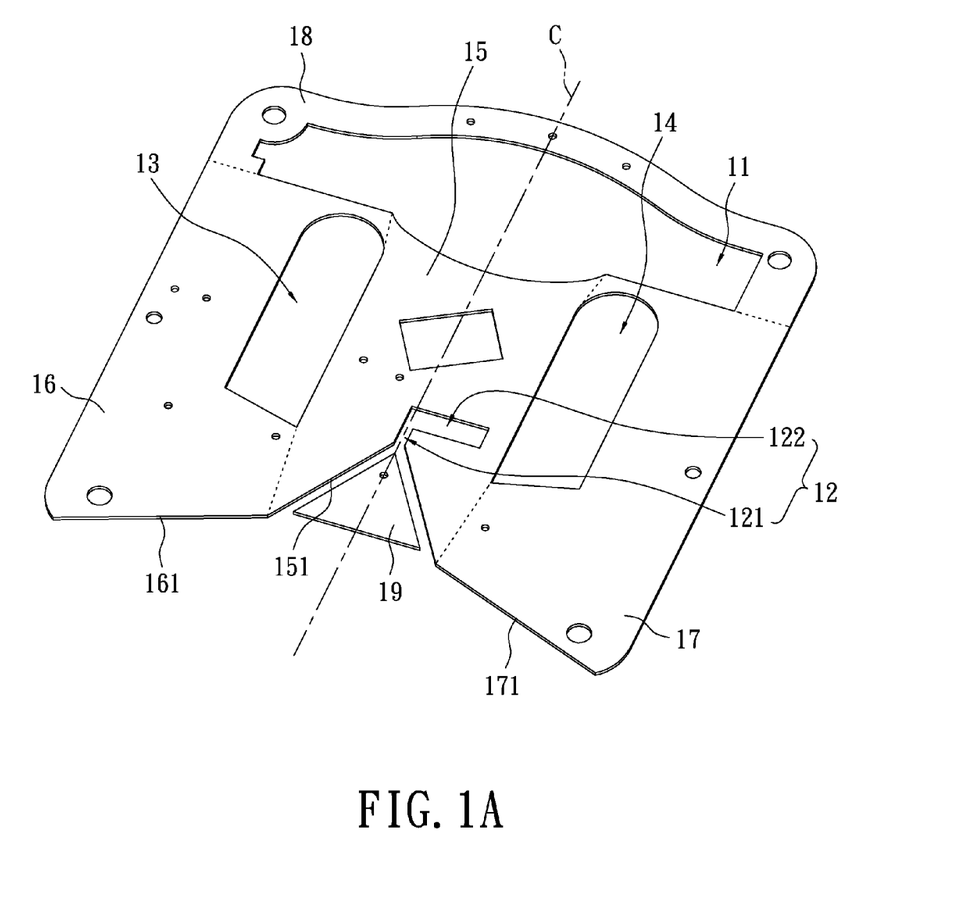
FIG. 1A shows a schematic view of a metallic antenna plate of the RFID device shown in FIG. 1.
Figure 1B:
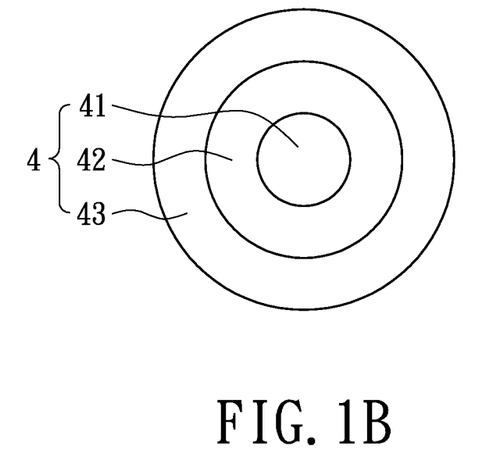
FIG. 1B shows a cross-sectional view of a first metallic tube for the RFID device shown in FIG. 1.
Figure 1C:
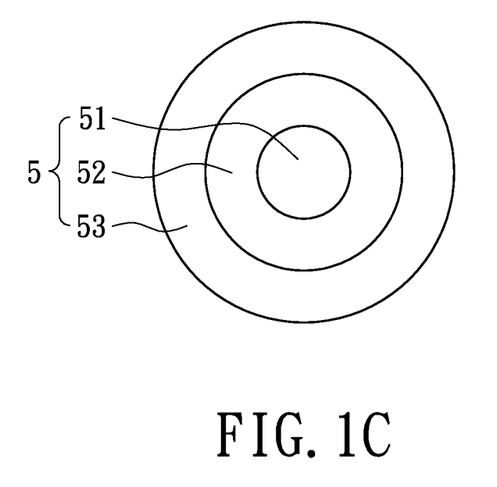
FIG. 1C shows a cross-sectional view of a second metallic tube for the RFID device shown in FIG. 1.

As shown in FIG. 1A, the metallic antenna plate 1 is substantially symmetric about a central axis C. The metallic antenna plate 1 defines an elongated first hole 11 and a L-shaped second hole 12 on opposite ends thereof along the central axis C. Furthermore, the metallic antenna plate 1 defines an elongated first side hole 13 and an elongated second side hole 14 on opposite sides thereof (i.e., the left and right sides as shown in FIG. 1A), where the first and second side holes 13, 14 are formed symmetrically about the central axis C.

The long axis of the first hole 11 is approximately perpendicular to the central axis C. The first and second side holes 13, 14 are partially arch-shaped, and the long axes of the first and second side holes 13, 14 are parallel to the central axis C. That is to say, the first hole 11, the first side hole 13, and the second side hole 14 are approximately arranged in a π-like shape.

The metallic antenna plate 1 further has a positioning portion 15, a first side portion 16, a second side portion 17, a connecting portion 18, and a coupled portion 19. The positioning portion 15, the first side portion 16, the second side portion 17, and the connecting portion 18 are formed in one piece.

The positioning portion 15 is surrounded by the first hole 11, the second hole 12, the first side hole 13, and the second side hole 14. One end of the positioning portion 15 away from the first hole 11 is reverse V-shaped in defining a notch 151. The second hole 12 is formed concavely on the positioning portion 15 adjacent to the notch 151. The second hole 12 is substantially L-shaped and is defined by a longitudinal region 121 and a transverse region 122.

Specifically, the longitudinal region 121 of the second hole 12 extends from the tip portion of the notch 151 in a direction toward the first hole 11 parallelly to the central axis C. The transverse region 122 extends perpendicularly from the longitudinal region 121 in a direction toward the second side hole 14. The extending direction of the transverse region 122 is normal to the central axis C.

The first and second side portions 16, 17 extend from opposite sides (i.e., the left and right sides in FIG. 1A) of the positioning portion 15 away from each other. The first and second portions 16, 17 are symmetrical about the central axis C. The first side hole 13 is cooperatively defined by the first side portion 16 and the positioning portion 15, and the second side hole 14 is cooperatively defined by the second side portion 17 and the positioning portion 15. That is to say, the first side portion 16 and the second side portion 17 are connected to the positioning portion 15 at opposite ends of the first side hole 13 and opposite ends of the second side hole 14, respectively (i.e., the top and bottom portions of the metallic antenna plate 1).

The first side portion 16 and the second side portion 17 each have a diagonal edge 161, 171, respectively. The diagonal edges 161, 171 are arranged adjacently to the notch 151. In particular, the diagonal edges 161, 171 extend obliquely from respective endpoints of the notch 151 in a direction away from the positioning portion 15. The angle formed by any of the diagonal edges 161, 171 with respect to the central axis C is greater than the angle formed by the notch 151 with respect to the central axis C.

The connecting portion 18 is substantially inverted U-shaped. The opposite ends of the connecting portion 18 are connected to the edges of the first side portion 16 and the second side portion 17 away from the diagonal edges 161, 171. The positioning portion 15 and the connecting portion 18 are spaced apart from each other and arranged in the path of the central axis C. In other words, the first hole 11 is cooperatively defined by the positioning portion 15, the first side portion 16, the second side portion 17, and the connecting portion 18.

The coupled portion 19 is substantially triangle-shaped. The coupled portion 19 is arranged in the path of the central axis C and spaced apart from the notch 151. The edges of the coupled portion 19 are approximately parallel to the corresponding edges of the notch edge 151, where the coupled portion 19 is coupled to the positioning portion 15.

As shown in FIGS. 1 and 1A, the insulting plate 2 is slightly arched and is substantially shaped matchingly to the metallic antenna plate 1. The insulating plate 2 has a plurality of restricting columns 21 protruding from an inner surface thereof Thus, when the metallic antenna plate 1 is mounted on the inner surface of the insulating plate 2, the relative position between the metallic antenna plate 1 and the insulating plate 2 can be maintained by the restricting columns 21.

The welding plate 3 is fixed on the positioning portion 15 of the metallic antenna plate 1 and arranged between the first hole 12 and the second hole 12. The welding plate 3 is used for welding the first metallic tube 4, the second metallic tube 5, or a plurality of signal wires (not shown).

Specifically, as shown in FIG. 1B, the first metallic tube 4 has a first conducting core 41 for connecting to the signal wires, a first insulating layer 42 covering the first conducting core 41, and a first metallic layer 43 covering the first insulating layer 42. Similarly, as shown in FIG. 1C, the second metallic tube 4 has a second conducting core 51 for connecting to the signal wires, a second insulating layer 52 covering the second conducting core 51, and a second metallic layer 53 covering the second insulating layer 52.

In this embodiment, the first and second conducting cores 41, 51 each is a conducting wire. The first and second insulating layers 42, 52 are constructed of Teflon, while the first and second metallic layers 43, 53 are made of copper. However, the exact material choice shall depend on specific operational requirement or practical needs and not be limited to the exemplary embodiment provided herein.

As shown in FIGS. 1 and 1A, one end of the first metallic tube 4 is welded to the welding plate 3. The first metallic tube 4 is disposed on the positioning portion 15, the first side portion 16, and the connecting portion 18 of the metallic antenna plate 1.

Specifically, the first metallic tube 4 is approximately arranged on one side of the central axis C. The first metallic tube 4 is extended from its welded end to the first side portion 16 between the first side hole 13 and the diagonal edge 161. Then, the first metallic tube 4 continues to extend from one side of the first side hole 13 away from the positioning portion 15 to the connecting portion 18. From the connecting portion 18, the first metallic tube 4 continues to extend toward the central axis C.

When the first metallic tube 4 extends from the first side portion 16 to the connecting portion 18, the first metallic tube 4 must extends across the first hole 11 (i.e., the portion of the first metallic tube 4 that extends across the first hole 11 is substantially parallel to the central axis C). The portions of the first metallic tube 4 arranged on opposite sides (i.e., above and below the first hole 11 in FIG. 1) of the first hole 11 are welded to the first side portion 16 and the connecting portion 18, respectively. Meanwhile, for the portion of the first metallic tube 4 that extends across the first hole 11, the first insulating layer 42 is partially exposed. That is to say, the first metallic layer 43 of the first metallic tube 4 is breached.

The extension of the first metallic tube 4 across the first hole 11 divides the first hole 11 into a large hole 111 and a small hole 112. Along the long axis of the first hole 11, the length of the large hole 111 is at least three times the length of the small hole 112.

One end of the second metallic tube 5 is welded to the welding plate 3 (a space is formed between the welded end of the second metallic tube 5 and the welded end of the first metallic tube 4). The second metallic tube 5 is disposed on the positioning portion 15 and the second side portion 17 of the metallic antenna plate 1.

Specifically, the second metallic tube 5 bendingly extends from its welded end on one side of the central axis C to be U-shaped. Then, the second metallic tube 5 continue to extends across the longitudinal region 121 of the second hole 12 (i.e., crossing to the other side of the central axis C). After extending across the longitudinal region 121, the second metallic tube 5 extends to the second side portion 17 between the second side hole 14 and the diagonal edge 171.

When the second metallic tube 5 extends across the longitudinal region 121 of the second hole 12 (i.e., the portion of the second metallic tube 5 that extends across the longitudinal region 121 is substantially perpendicular to the central axis C), the second metallic tube 5 is welded to the positioning portion 15 on opposite sides (left and right sides in FIG. 1) of the longitudinal region 121. Like the first metallic tube 4, for the portion of the second metallic tube 5 that extends across the second hole 12, the second insulating layer 52 is partially exposed. That is to say, the second metallic layer 53 of the second metallic tube 5 is breached.

The positions of the restricting columns 21 are arranged along the path travelled by first and second metallic tubes 4, 5. Thus, the first and second metallic tubes 4, 5 are maintained at its proper locations on the metallic antenna plate 1 by the restricting columns 21.

Thus, the RFID device achieves vertical polarization by utilizing the first metallic tube 4 and the metallic antenna plate 1. The utilization specifically involves running the first metallic tube 4 across the first hole 11 and welding the first metallic tube 4 to the first side portion 16 and the connecting portion 18 on opposite sides of the first hole 11.

Moreover, the RFID device achieves horizontal polarization by utilizing the second metallic tube 5 and the metallic antenna plate 1. The utilization involves running the second metallic tube 5 across the longitudinal region 121 of the second hole 12 and welding the second metallic tube 5 to the positioning portion 15 on opposite sides of the longitudinal region 121.

Thus, the RFID device of the instant disclosure utilizes the first and second metallic tubes 4, 5 and the metallic antenna plate 1 to replace the PCB/circuit components of the inventors' prior design. Thus, the manufacturing cost of the RFID device can be reduced to increase the product's market competitiveness.

Figure 2:
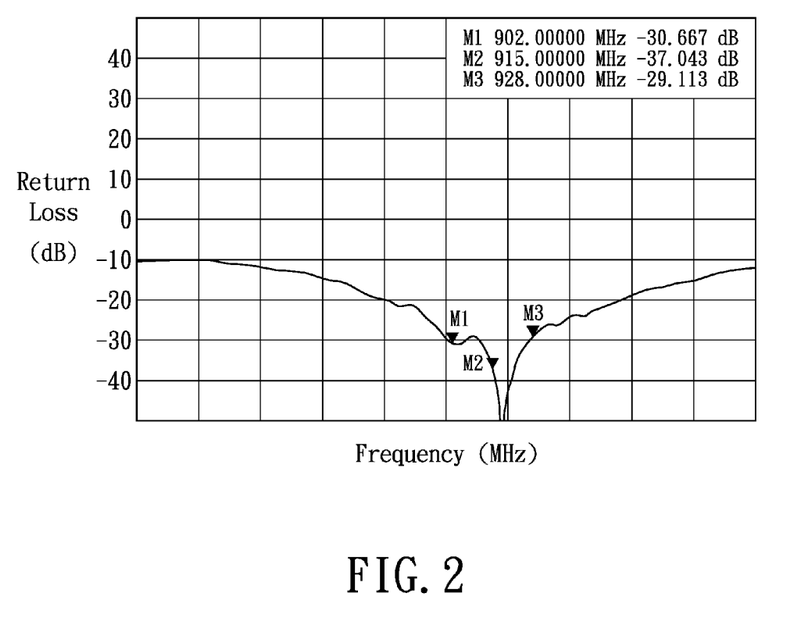
FIG. 2 is a plot showing the vertical polarization test of the RFID device of the instant disclosure operable in the U.S. bandwidth.
Figure 2A:
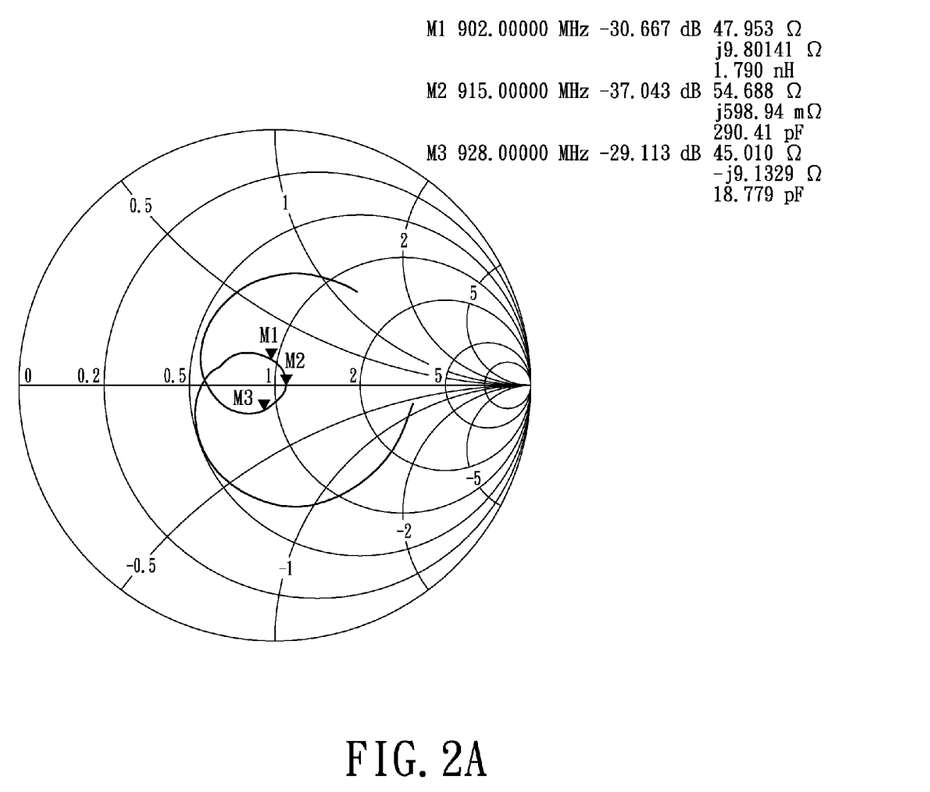
FIG. 2A shows a Smith chart mapped from the plot in FIG. 2.
Figure 3:
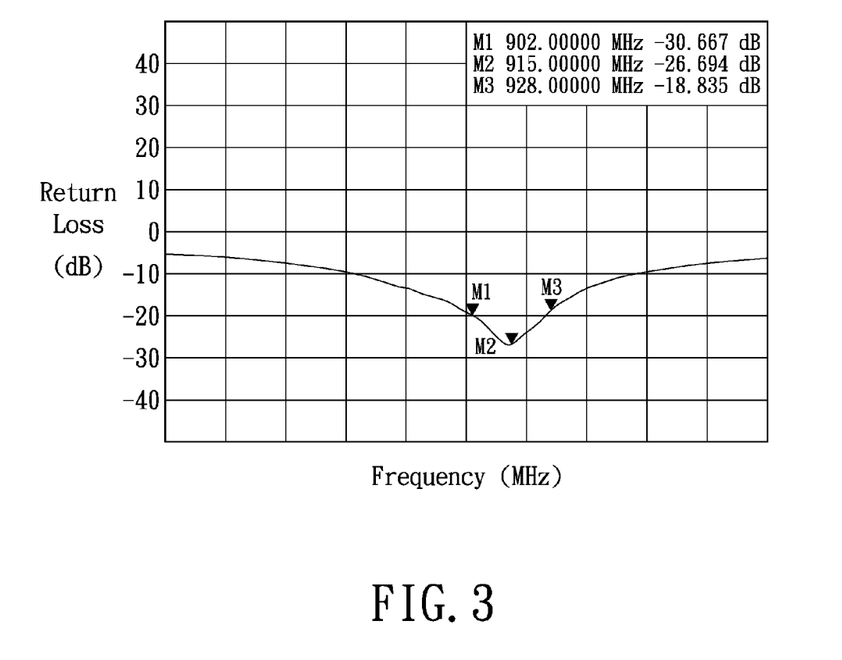
FIG. 3 is a plot showing the horizontal polarization test of the RFID device of the instant disclosure operable in the U.S. bandwidth.

Next, FIGS. 2 and 2A show the results of the vertical polarization test for the RFID device of the instant disclosure operable in the US bandwidth. Whereas FIGS. 3 and 3A show the results of the horizontal polarization test for the RFID device.

Figure 3A:
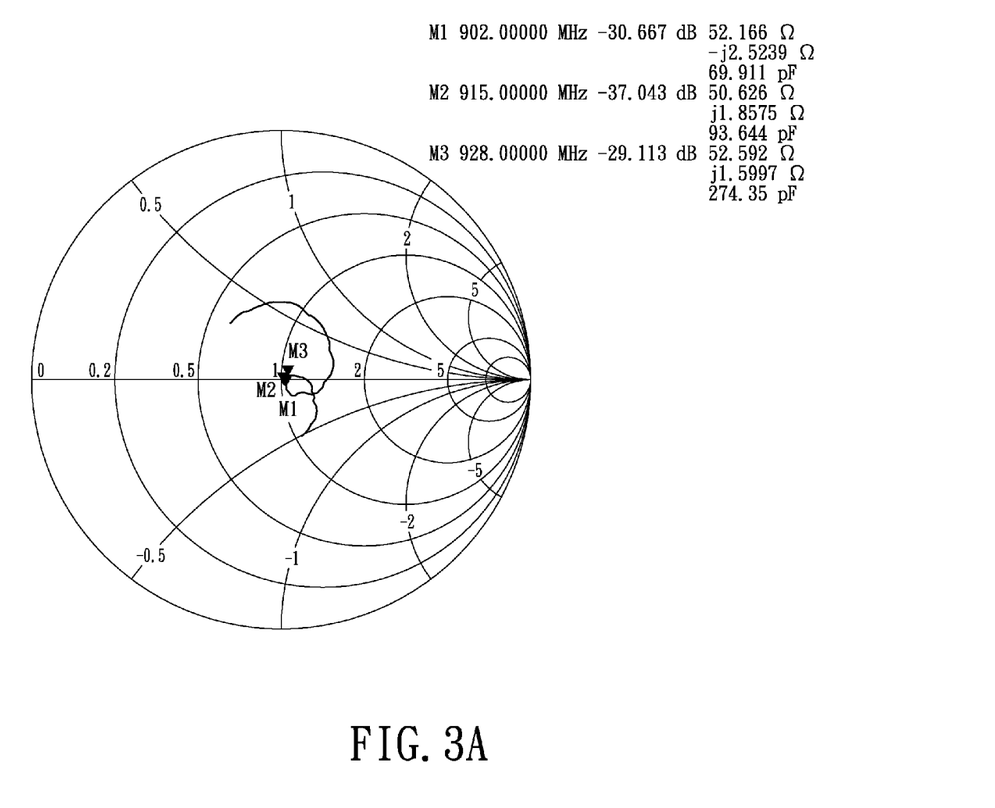
FIG. 3A shows a Smith chart mapped from the plot in FIG. 3.

By comparing the Smith charts shown in FIGS. 2A and 3A to the Smith charts of the inventors' prior product (which are FIGS. 5B and 6B shown in the Taiwan Pat. No. M391736), the measured parameters are closer to the center than the inventors' prior product. Thus, the RFID device of the instant disclosure has better vertical and horizontal polarization performances than the inventors' prior product.

Besides, the structure of the metallic antenna plate 1, the length of the first metallic tube 4, the length of the second metallic tube 5, and the relative position between the metallic antenna plate 1, the first metallic tube 4, and the second metallic tube 5 can be changed by the antenna designer for adapting the RFID device to different operating bandwidths (such as in Europe).

Figure 4:
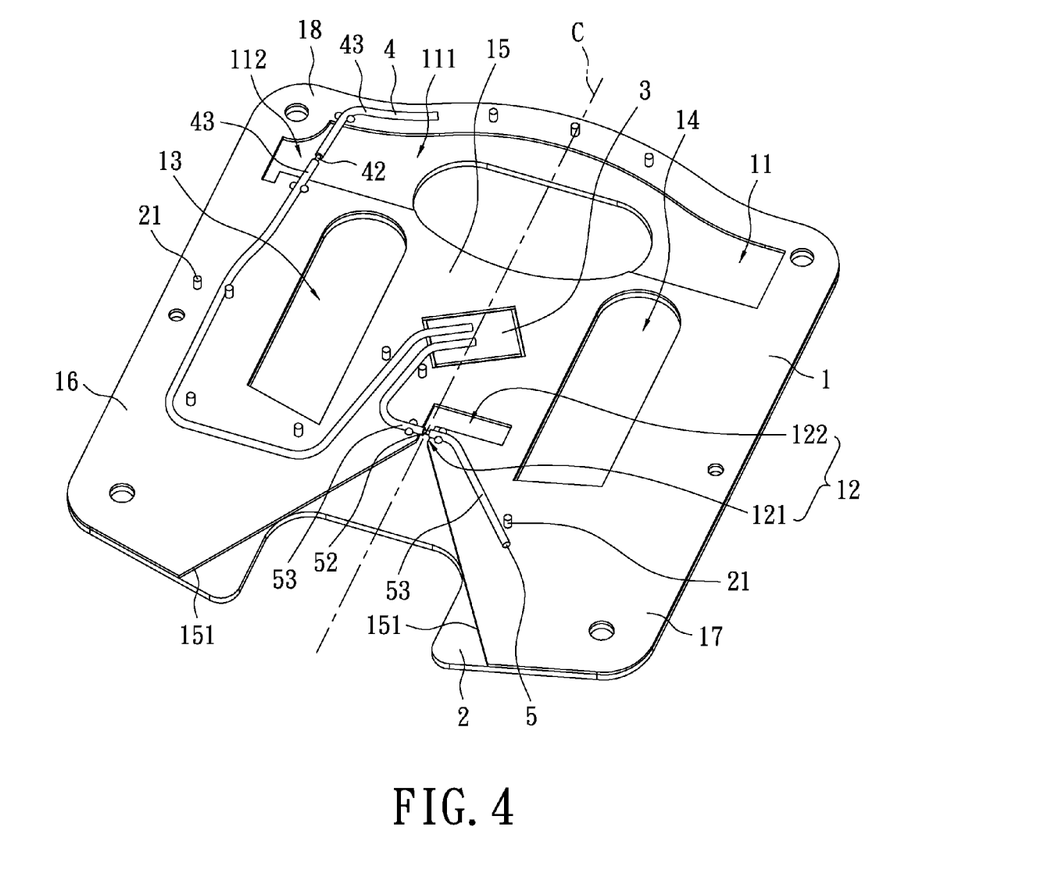
FIG. 4 shows a schematic view of an RFID of the instant disclosure operable in the Europe bandwidth.
Figure 4A:
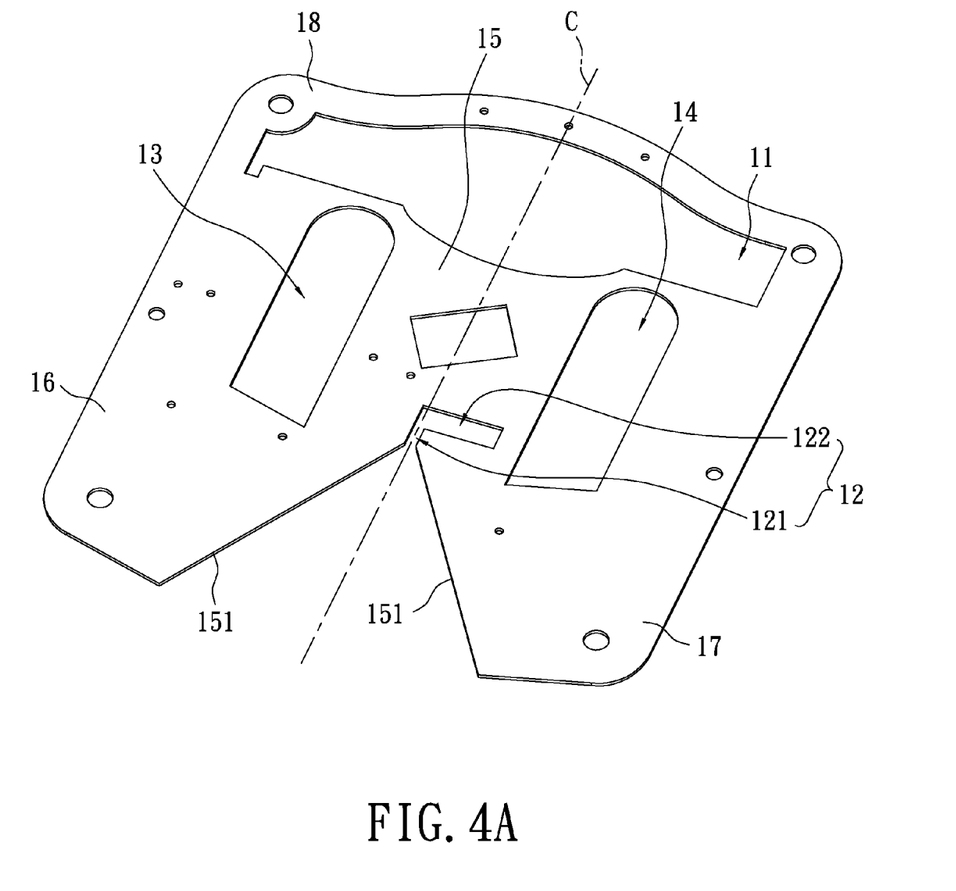
FIG. 4A shows a schematic view of a metallic antenna plate of the RFID device in FIG. 4.

For example, FIGS. 4 and 4A show the RFID device of the instant disclosure operable in the bandwidth used in Europe (865-869 MHz). In comparing to the abovementioned RFID device for the U.S. bandwidth, some structural modifications are made.

Namely, the RFID device of the instant disclosure used for European bandwidth does not have the coupled portion 19 and the diagonal edges 161, 171. In other words, the respective edges of the notch edge 151 extend directly to the first side portion 16 and the second side portion 17. Moreover, some adjustments are made for the metallic antenna plate 1, the first metallic tube 4, and the second metallic tube 5 of the RFID device. These adjustments are observable by comparing FIGS. 1 and 4, with no further elaboration provided herein.

Figure 5:
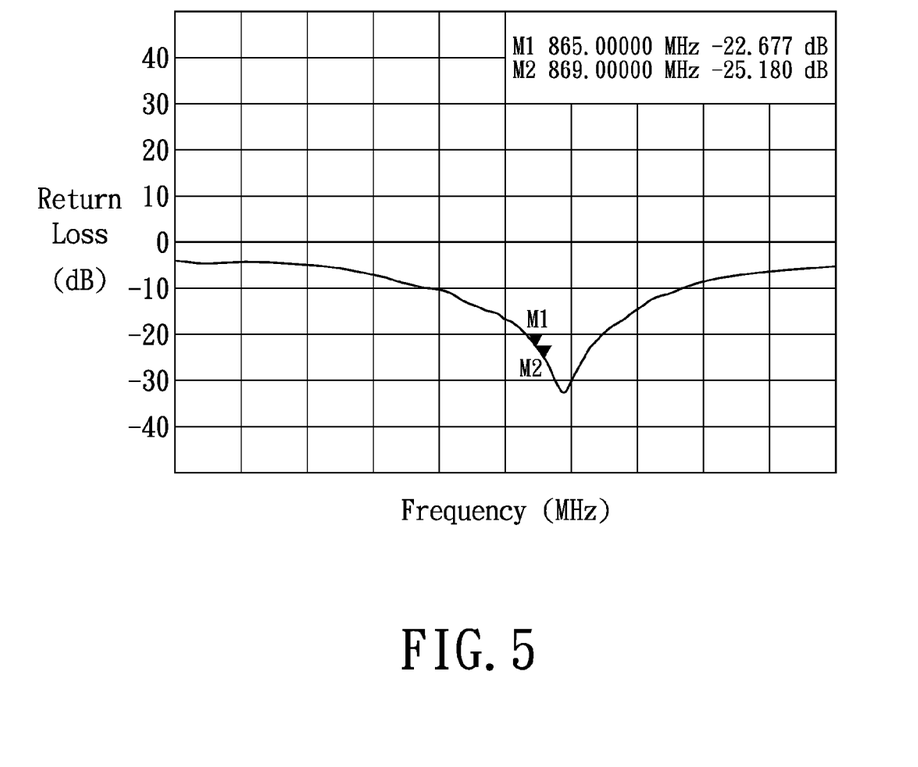
FIG. 5 is a plot showing the vertical polarization test of the RFID device of the instant disclosure operable in the Europe bandwidth.
Figure 5A:
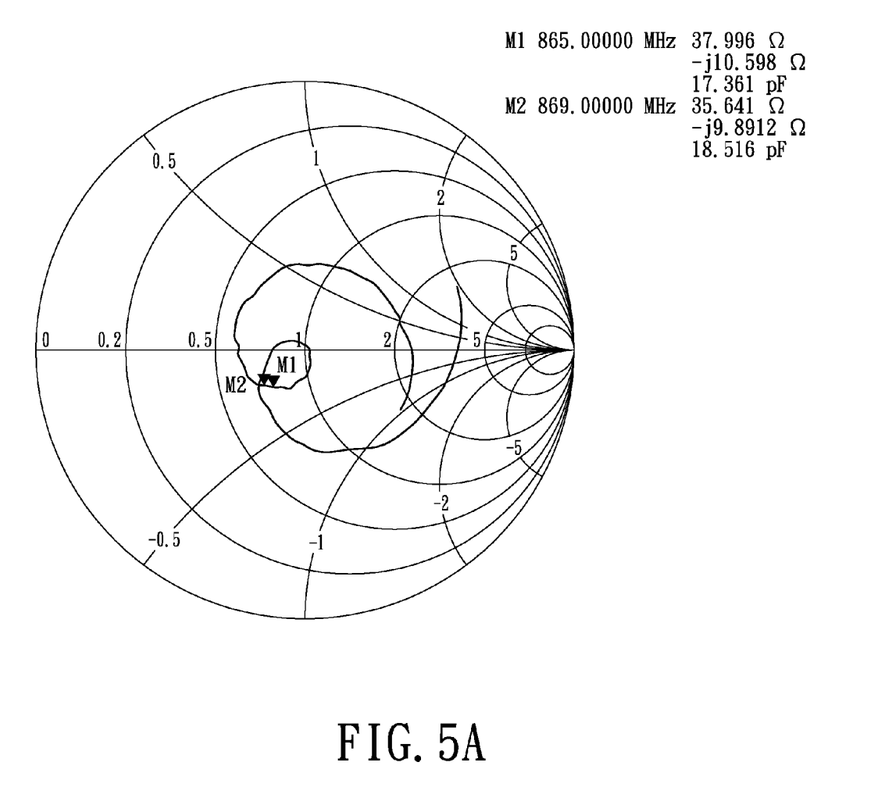
FIG. 5A shows a Smith chart mapped from the plot in FIG. 5.
Figure 6:
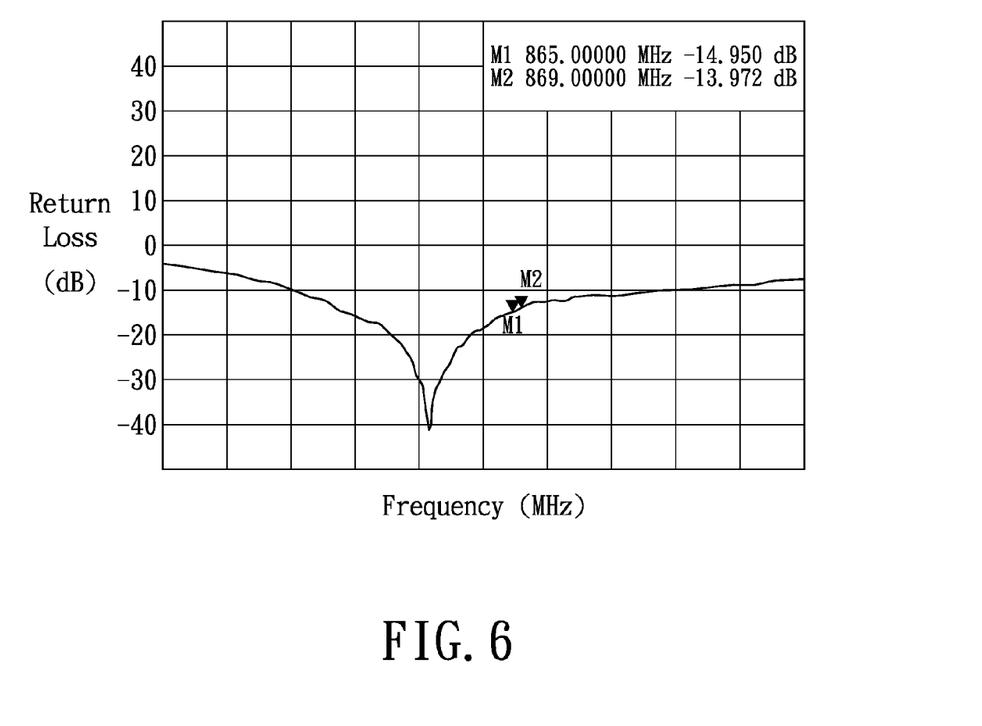
FIG. 6 is a plot showing the horizontal polarization test of the RFID device of the instant disclosure operable in the Europe bandwidth.

Now referring to FIGS. 5 and 5A, which show the results of the vertical polarization test for the RFID device of the instant disclosure used for European bandwidth. Whereas FIGS. 6 and 6A show the results of the horizontal polarization test for the RFID device of the instant disclosure.

Figure 6A:
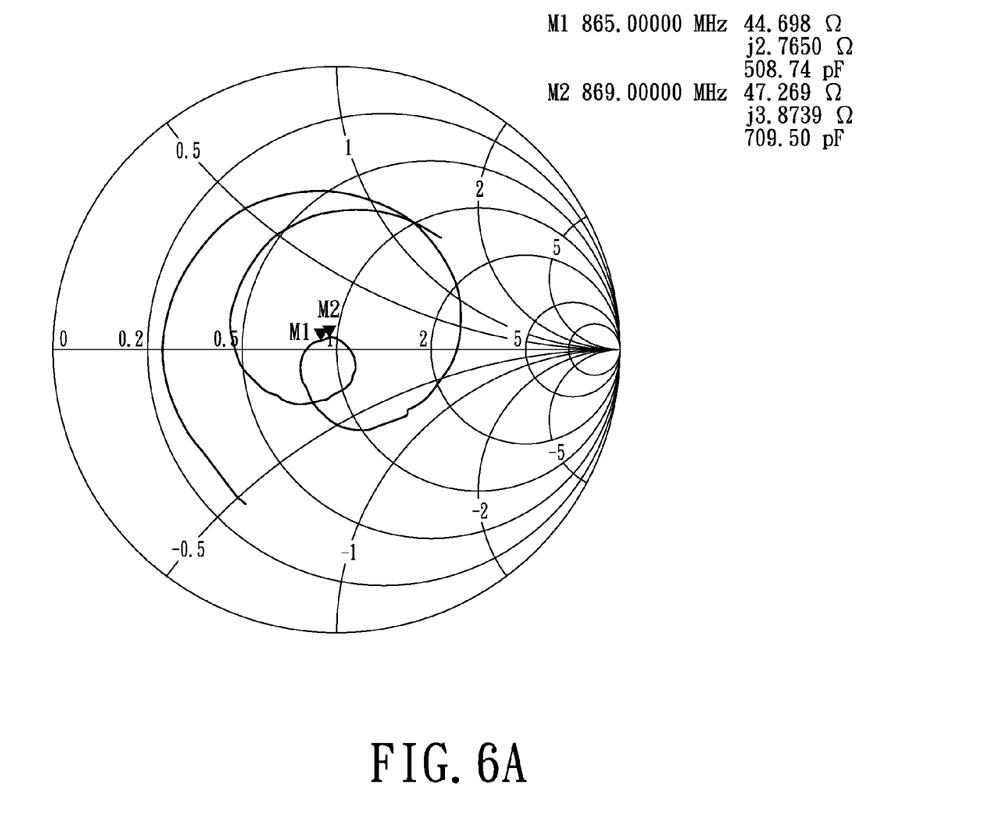
FIG. 6A shows a Smith chart mapped from the plot in FIG. 6.

By comparing the Smith charts shown in FIGS. 5A and 6A to the Smith charts of the inventors' prior product (which are FIGS. 8B and 9B as disclosed in the Taiwan Pat. No. M391736), the measured parameters are closer to the center than the inventors' prior product. Thus, the RFID device of the instant disclosure has better vertical and horizontal polarization performances than the inventors' prior product.

Based on the above embodiments, the RFID device of the instant disclosure utilizes the first and second metallic tubes 4, 5, which are welded to the metallic antenna plate 1, and the crossing of the first hole 11 by the first metallic tube 4 and the crossing of the second hole 12 by the second metallic tube 5 to replace the PCB/circuit components of the inventors' prior design. The replacement allows the reduction in manufacturing cost.

Moreover, the RFID device of the instant disclosure can be adjusted for using with different bandwidths. For example, when the device operates in the bandwidth used in U.S. or Europe, the test results show the device can achieve a better vertical and horizontal polarization performance than the inventors' prior design.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A radio frequency identification (RFID) device for connecting a plurality of signal wires, comprising:

A metallic plate defining a central axis, a first hole, and a second hole, the metallic plate having a positioning portion surrounding the second hole and formed in the path of the central axis, A first metallic tube having a first conducting core for connecting at least one of the signal wires, a first insulating layer covering the first conducting core, and a first metallic layer covering the first insulating layer, the first metallic layer accessibly disposed on the metallic plate, one end of the first metallic tube being disposed on the positioning portion, the first metallic tube being extended across the first hole and welded to the metallic plate on opposite sides of the first hole, the first insulating later being partially exposed at the corresponding portion of the first metallic tube extending across the first hole; and A second metallic tube having a second conducting core for connecting at least one of the signal wires, a second insulating layer covering the first conducting core, and a second metallic layer covering the second insulating layer, the second metallic layer accessibly disposed on the metallic plate, one end of the second metallic tube being disposed on the positioning portion, the second metallic tube being extended across the second hole and welded to the metallic plate on opposite sides of the second hole, the second insulating later being partially exposed at the corresponding portion of the second metallic tube extending across the second hole; the portion of the second metallic tube extending across the second hole being substantially perpendicular to the portion of the first metallic tube extending across the first hole.

2. The RFID device as claimed in claim 1, wherein the first hole has an elongated shape, wherein the first hole is divided by the first metallic tube into a large hole and a small hole, and wherein the length of the of the large hole is at least three times greater than the length of the small hole along the long axis of the first hole.

3. The RFID device as claimed in claim 2, wherein the second hole is formed concavely form an end of the positioning portion away from the first hole, wherein the second hole is defined by a longitudinal region and a transverse region, wherein the second metallic tube extends across the longitudinal region and is welded to the positioning portion on opposite sides of the longitudinal region.

4. The RFID device as claimed in claim 2, wherein the portion of the first metallic tube that travels across the first hole is substantially paralleled to the central axis, while the portion of the second metallic tube that travels across the second hole is substantially perpendicular to the central axis.

5. The RFID device as claimed in claim 2, wherein the length of the first metallic tube is longer than the length of the second metallic tube.

6. The RFID device as claimed in claim 1, further comprising a welding plate fixed to the positioning portion of the metallic plate, wherein the first and the second metallic tubes are welded to the welding plate.

7. The RFID device as claimed in claim 1, further comprising an insulating plate, wherein the insulating plate has a plurality of restricting columns protruded therefrom, wherein the metallic plate is disposed on the insulating plate, and the positions of the first and second metallic tubes are restricted by the restricting columns.

8. The RFID device as claimed in claim 1, wherein the metallic plate has a first side portion and a second side portion formed extendingly from opposite sides of the positioning portion, wherein a first side hole is defined by the first side portion and the positioning portion, and a second side hole is defined by the second side portion and the positioning portion.

9. The RFID device as claimed in claim 8, wherein the metallic plate has an U-shaped connecting portion, wherein the respective ends of the connecting portion are connected to the first and second side portions, wherein the first hole is defined by the positioning portion, the first side portion, the second side portion, and the connecting portion, and wherein an opposite end of the first metallic tube is disposed on the connecting portion.

10. The RFID device as claimed in claim 1, wherein the metallic plate has a coupled portion arranged in the path of the central axis, and wherein the coupled portion is spaced apart from the positioning portion, the first metallic tube, and the second metallic tube.

11. The RFID device as claimed in claim 10, wherein the end of the positioning portion away from the first hole is reverse V-shaped in defining a notch, and the coupled portion is substantially triangle-shaped and correspondingly arranged adjacent to the notch.

* * * * *